United States Patent

[11] 3,542,338

| [72] | Inventor | Domer Scaramucci<br>3245 S. Hattie, Oklahoma City, Oklahoma 73129 |
|---|---|---|
| [21] | Appl. No. | 756,078 |
| [22] | Filed | July 29, 1968<br>Continuation-in-part of Ser. No. 547,926, May 5, 1966, abandoned. |
| [45] | Patented | Nov. 24, 1970 |

[54] THROTTLING VALVE
9 Claims, 14 Drawing Figs.

[52] U.S. Cl. .................................................. 251/209,
251/315, 251/328
[51] Int. Cl. .................................................. F16k 5/06
[50] Field of Search .................................................. 251/317,
315, 209, 208, 309, 328

[56] References Cited
UNITED STATES PATENTS

| 1,534,866 | 4/1925 | Page | 251/209X |
| 2,018,034 | 10/1935 | Roberts | 251/309 |
| 2,564,223 | 8/1951 | Long | 251/209 |
| 2,573,238 | 10/1951 | Wunn | 251/283X |
| 3,188,049 | 6/1965 | Zawacki et al. | 251/327 |
| 3,403,887 | 10/1968 | Myers | 251/209 |

FOREIGN PATENTS

| 669,950 | 8/1929 | France | 251/124 |
| 801,206 | 5/1936 | France | 251/309 |
| 1,072,917 | 3/1954 | France | 251/317 |

Primary Examiner—M. Cary Nelson
Assistant Examiner—Michael O. Sturm
Attorney—Dunlap, Laney, Hessin & Dougherty

ABSTRACT: An improved throttling valve wherein the flow passageway therethrough is so defined as to concentrate the erosive effect of the fluid flow on the downstream seat assembly, and having an upstream seat assembly which functions as an upstream seal when the valve is in the closed position, thus enabling the valve to function effectively as a throttling valve and as a shutoff valve.

Patented Nov. 24, 1970 3,542,338

INVENTOR.
DOMER SCARAMUCCI
BY
*Dunlap and Laney*
ATTORNEYS

Patented Nov. 24, 1970

INVENTOR.
DOMER SCARAMUCCI
BY
Dunlap, Laney & Hessin
ATTORNEYS

INVENTOR.
DOMER SCARAMUCCI
BY
ATTORNEYS

THROTTLING VALVE

CROSS REFERENCE TO RELATED APPLICATION

This application is a continuation-in-part of copending application Ser. No. 547,926, filed May 5, 1966, now abandoned.

BACKGROUND OF THE INVENTION

1. Field of the Invention

This invention relates generally to improved throttling valves. More particularly, but not by way of limitation, this invention relates to an improved valve for controlling the flow of fluid therethrough by varying the area of the flow passageway and simultaneously providing the improved valve with means for effecting the complete closure of the valve.

2. Description of the Prior Art

Various types of valves have been constructed in the past for throttling the flow of fluid therethrough and, thus, controlling the flow of fluid through the circuit with which they are associated. Generally, such valves have incorporated some means for reducing the flow passageway through the valve. Usually, the reduction is accomplished by a tapered flow passageway extending through a plug or ball valve member, by reducing the area of the outlet passageway from the valve as compared to the area of the inlet passageway, or by a combination of the foregoing.

While valves constructed in one or more of the aforementioned ways have been reasonably effective in performing the throttling function, none have been effective to provide for the complete and fluidtight closure of the valves. The difficulty in obtaining closure in throttling valves has been due to erosion on the seals in the valve resulting from the high velocity of fluid flowing therethrough as the area of the flow passageway through the valve is reduced.

SUMMARY OF THE INVENTION

This invention provides an improved throttling valve having a bore extending therethrough. A first annular means, having a surface thereon formed from an erosion resistant material, is located in the downstream end of the valve body. A second annular means spaced from said first annular means, is located in the upstream end of the body and is also encircling a portion of said bore. A valve member is disposed in said bore relatively between said annular means and movable relative to said annular means to define, with the erosion-resistant surface, a variable area flow passageway extending through the valve. The valve member is movable from a position wherein said flow passageway is fully open to a position wherein said valve member engages said second annular means to close said flow passageway. The flow passageway is shaped to close at said first annular means prior to being closed at said second annular means when said valve member is being moved to a closed position, to concentrate erosive wear in said valve at said surface when the flow passageway is partially open. The second annular means includes a relatively rigid seal body, which is slidingly disposed in said bore, and a first resilient annular member which is carried by said seal body sealingly engaging said valve member when said valve member is in the closed position. A second resilient annular member is carried by said seal body in sliding and sealing engagement with said valve body in said bore along a diameter greater than the diameter of said first resilient annular member, whereby said second annular seal means will be biased toward the valve member by the pressure in the upstream end of the valve.

One object of the invention is to provide an improved throttling valve.

Another object of the invention is to provide an improved throttling valve that yet provides for the complete fluidtight closure of the valve when the valve member is in the position closing the flow passageway.

A further object of the invention is to provide an improved ball valve capable of effectively throttling fluid flow therethrough.

Still another object of the invention is to provide an improved ball valve that effectively throttles and yet provides for a fluidtight closure in the valve.

A still further object of the invention is to provide an improved ball valve that effectively throttles and yet provides for a fluidtight closure in the valve, wherein the inlet and exit areas of the port therethrough are equal.

One further object of the invention is to provide an improved gate valve suitable for throttling fluid flowing therethrough.

One other object of the invention is to provide an improved gate valve that provides an effective throttling of fluid flow therethrough and yet forms a fluidtight closure when in the closed position.

The foregoing and additional objects and advantages of the invention will become more apparent as the following detailed description is read in conjunction with the accompanying drawings wherein like reference characters denote like parts in all views.

DESCRIPTION OF THE PREFERRED EMBODIMENTS

Figure 1:
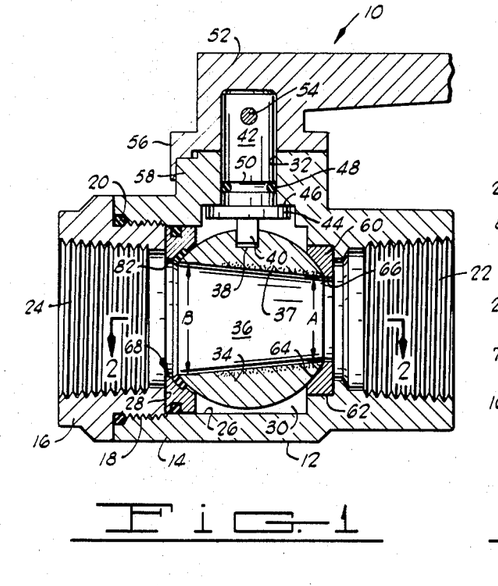
FIG. 1 is a vertical cross-sectional view of a ball valve constructed in accordance with the invention.

Referring to the drawing and to FIG. 1 in particular, shown therein and generally designated by the reference character 10 is a ball valve constructed in accordance with the invention. The ball valve 10 includes a valve body 12 comprising a body member 14 and an inlet member 16 threadedly connected to the body member 14 as shown at 18. An O-ring seal 20 is disposed between the inlet member 16 and the body member 14, preventing the escape of fluid through the threads 18.

A partially threaded outlet opening 22 extends through the body member 14, and a partially threaded inlet opening 24 extends through the inlet member 16 forming a bore extending through the valve body 12. The threaded portions of the openings 22 and 24 are provided so that the valve 10 can be connected in a fluid circuit (not shown). Manifestly, any suitable means of connecting the valve 10 in the circuit may be utilized.

The body member 14 has a counterbore 26 formed therein cooperating with an end face 28 on the inlet member 16 to form an enlarged cavity 30 in the valve body 12. An opening 32 extends transversely through the body member 14 intersecting the counterbore 26.

A valve member 34, which is illustrated as being spherical in configuration, is disposed in the cavity 30 and has a tapered flow port 36 extending therethrough. The port 36 is preferably partially or fully treated with an erosion resistant material 37. If desired, the port 36 can be lined with a replaceable member (not shown) that is constructed from an erosion resistant material. Suitable treatments and/or materials are discussed in more detail hereinafter.

The exterior of the valve member 34 is provided with a rectangular recess 38 that is sized to receive a rectangular lower end 40 on a valve operating member 42. The valve operating member 42 extends through the opening 32 and includes a flange 44 that is in engagement with a downwardly facing surface 46 in the body member 14 to limit the upward movement of the valve operating member 42 relative to the valve body 12. An O-ring seal 48 is disposed in an annular groove 50 encircling the valve operating member 42. The O-ring seal 48 sealingly engages the valve operating member 42 and the body member 14 in the opening 32.

The upper end of the valve operating member 42 is connected with a valve handle 52 by a pin 54. The valve handle 52 includes a lug portion 56 that is arranged to engage one or more abutments 58 (only one is shown in FIG. 1) that are located on the body member 14 to limit the rotational movement of the valve handle 52 and the interconnected valve member 34 to approximately 90°.

An annular member 60 is disposed in annular recess 62 formed in the body member 14 adjacent the threaded portion of the bore 22. The annular member 60 has a surface 64 thereon conforming to the exterior surface of the valve member 34. The annular member 60 has an inner periphery 66 that is substantially equal to a diameter A of the small end of the flow port 36 as is clearly shown in FIG. 1.

The annular member 60 is preferably constructed from a material that is sufficiently rigid to support the valve member 34 in the valve 10 and has good erosion resistant characteristics for reasons that will appear more fully hereinafter. For example, the annular member 60 may be hard-surfaced, heat-treated, or constructed from a ceramic, plastic, or even natural or synthetic rubber if the load bearing characteristics are suitable for the pressure range of the valve. Manifestly, the annular member 60 can be eliminated if the surface of the body member 14 adjacent the valve member 34 is suitably constructed and treated to provide the erosion resistance.

The valve 10 also includes an annular seal assembly 68 located in the body member 14 adjacent the end face 28 on the upstream or inlet member 16. As shown more clearly in FIG. 2, the seal assembly 68 includes a relatively rigid seal body 70 that has an outer periphery 72 sized to slidingly fit within the counterbore 26 of the valve body member 14.

Figure 2:
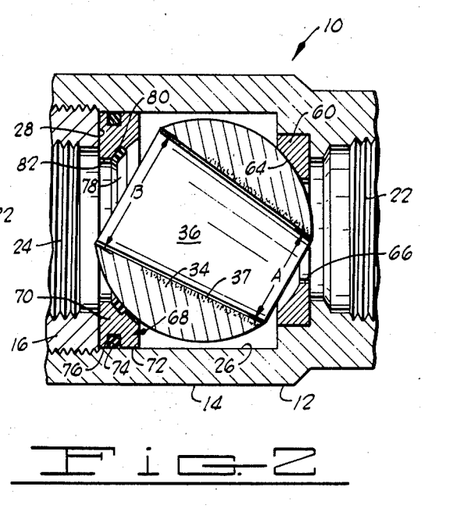
FIG. 2 is an enlarged fragmentary cross-sectional view of the valve of FIG. 1 taken substantially along the line 2–2 of FIG. 1, but showing the valve member rotated into a throttling position.

An O-ring seal 74 is disposed in an annular groove 76 formed in the seal body 70 adjacent the outer periphery 72. The O-ring seal 74 slidingly and sealingly engages the valve body 12 in the counterbore 26.

The preferred form of the seal assembly 68 also includes an annular seal member 78 disposed in an annular recess 80 formed in the seal body 70. The annular seal member 78 is arranged to sealingly engage the exterior surface of the valve member 34.

The seal assembly 68 has an inner periphery 82. As shown most clearly in FIG. 1, the inner periphery 82 is substantially equal in diameter to the diameter B of the large end of the flow port 36 that extends through the valve member 34.

Figure 1A:
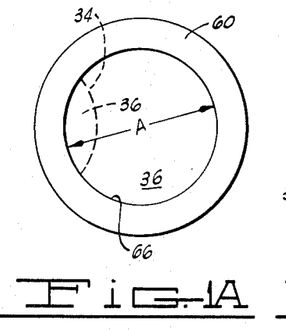
FIG. 1A is an enlarged fragmentary view illustrating one configuration of flow port that may be utilized in the valve of FIG. 1.
Figure 1B:
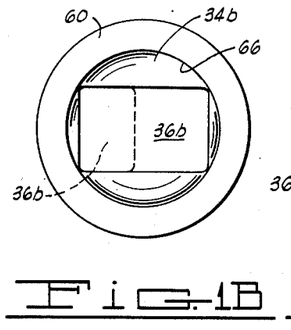
FIG. 1B is a view similar to FIG. 1A, but illustrating an additional flow port configuration.
Figure 1C:
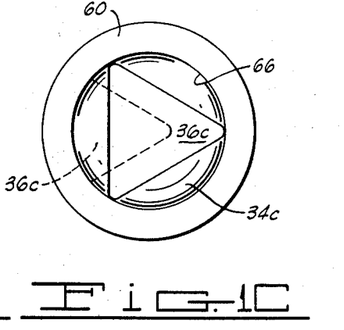
FIG. 1C is a view similar to FIG. 1A, but illustrating still another configuration of flow port that can be utilized in the valve of FIG. 1.

FIGS. 1A, 1B and 1C are fragmentary views illustrating examples of the configurations of flow ports that can be utilized in the valve member 34. As illustrated in FIG. 1A, the circular cross-sectional configuration of flow port 36 is illustrated in conjunction with the annular member 60. The dash line arc thereon illustrates one edge of the flow port 36 when the valve member 34 has been rotated to a throttling position as will be described.

FIG. 1B illustrates a rectangular flow port 36b extending through a valve member 34b shown in conjunction with the annular member 60. As illustrated therein, the dash line illustrates one edge of the flow port 36b when the valve member 34b has been rotated to a throttling position.

FIG. 1C illustrates a flow port 36c having a triangular cross-sectional configuration extending through a valve member 34c. As shown therein, the dash line indicates the configuration of the flow port 36c when the valve member 34c has been rotated to a throttling position. It will be understood that the cross-sectional configuration of the flow port may be of any desired configuration to produce the throttling effect desired through the valve 10. Also, it will be understood that each of the flow ports 36, 36b and 36c will be tapered from the small end illustrated, whereby the other end will have a larger flow area.

OPERATION OF THE EMBODIMENT OF FIGURE 1

As shown in FIG. 1, the valve 10 is positioned with the valve member 34 axially alined with the inlet and outlet openings 24 and 22, respectively, in the valve body 12. With the valve member 34 in this position, the throttling effect produced by the valve 10 is due to the tapered configuration of the flow port 36 which substantially coincides with the inner periphery 66 of the annular member 60.

When a greater throttling effect is desired, the handle 52 is rotated until the valve member 34 assumes the position substantially as illustrated in FIG. 2. As shown therein, the throttling effect is produced both by the tapered configuration of the flow port 36 and by a portion of the inner periphery 66 of the annular member 60. It should be pointed out that the large end (diameter B) of the flow port 36 remains in a substantially open or full flow position with respect to fluid entering the flow port 36 from the inlet bore 24 in the valve body 12.

Fluid flowing through the port 36 encounters the reduced area (diameter A) of both the tapered flow port 36 and the inner periphery 66 of the annular member 60. Manifestly, a velocity increase occurs at a position adjacent the annular member 60, but not in the inlet end or large end of the flow port 36.

Thus, any erosion occurring in the valve 10 as a result of the increased fluid velocity occurring due to the throttling effect is located adjacent the annular member 60 and is essentially eliminated from the seal assembly 68. Since the annular member 60 is preferably constructed from the erosion resistant material, the effects of the fluid velocity increase in the valve 10 are substantially obviated.

It will also be obvious that as the valve member 34 is rotated toward the maximum throttling position, that is, to the position wherein the flow port 36 is substantially closed by the annular member 60, the upstream or large end (diameter B) of the flow port 36 remains substantially open or at least has a flow area that is considerably larger than the flow area defined by the small end (diameter A) of the flow port 36 in conjunction with the annular member 60.

Figure 3:
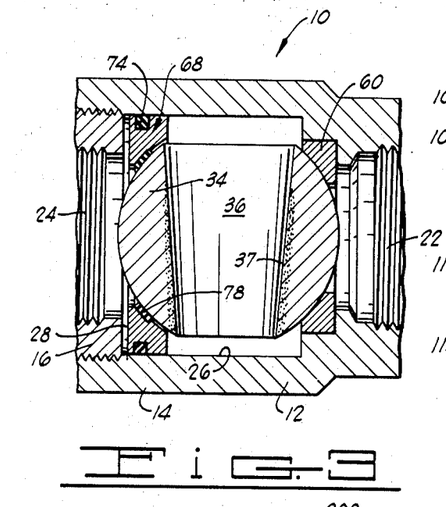
FIG. 3 is an enlarged fragmentary cross-sectional view similar to FIG. 2, but illustrating the valve member in the closed position.

When the valve member 34 is moved to the closed position, that is, to the position illustrated in FIG. 3, it can be seen that the flow passageway extending through the valve 10 is closed. The valve member 34, functioning in conjunction with the annular member 60, may not provide a fluidtight seal that will prevent flow through the valve 10. However, the upstream seal assembly 68 is responsive to fluid pressure in the inlet opening 24 when the valve member 34 is in the closed position.

Thus, the seal assembly 68 moves along the counterbore 26 in the body member 14 to maintain the annular seal member 78 in sealing engagement with the exterior surface of the valve member 34. As can be appreciated from viewing FIG. 3, fluid cannot flow through the valve 10 due to the sealing engagement between the annular member 78 and the valve member 34, and due to the sealing engagement of the O-ring seal 74 with the body member 14 in the counterbore 26. Thus, the valve 10 not only provides for optimum throttling with minimum wear on the upstream seal assembly 68, but also provides for a complete fluidtight closure of the valve 10 when the valve member 34 is rotated to the closed position.

Figure 4:
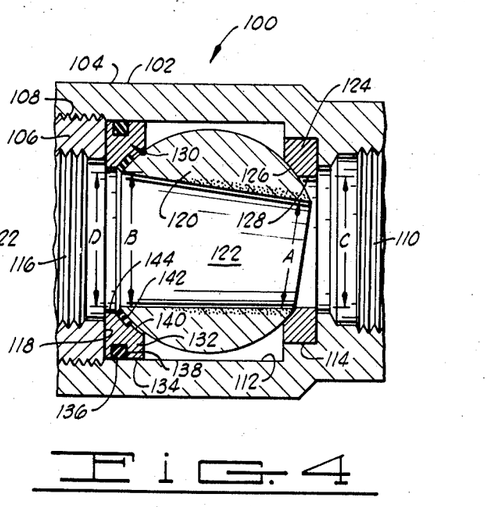
FIG. 4 is a cross-sectional view similar to FIG. 2, but illustrating still another embodiment of a ball valve constructed in accordance with the invention.

EMBODIMENT OF FIGURE 4

The fragmentary cross-sectional view of FIG. 4 illustrates another embodiment of throttling valve generally designated by the reference character 100 and also constructed in accordance with the invention. It will be understood that the throttling valve 100 includes the necessary operating components as previously described in connection with FIG. 1.

As shown in FIG. 4, the valve 100 includes a valve body 102 comprising a body member 104 and an inlet member 106 connected with the body member 104 by mating threads 108. The valve body member 104 includes a partially threaded opening 110 that extends therethrough, a counterbore 112, and a second counterbore forming a recess 114 formed in the body member 104 adjacent the end of the counterbore 112.

The inlet member 106 also has an opening 116 that is partially threaded and extends therethrough and an end face 118 that is disposed in the body member 102 substantially perpendicularly to the axis of the opening 116.

A valve member 120 is disposed in the counterbore 112 in the body member 104 and has a flow port 122 extending therethrough. As illustrated, the flow port 122 includes a large end having a diameter B and a small end having a diameter A. As clearly shown in FIG. 4, the diameter A is less than the diameter B defining a tapered flow port 122. It should be emphasized that the flow port 122 is arranged eccentrically with respect to the axis of the valve member 120, that is, the flow port 122 in the preferred form thereof may be described as an oblique truncated cone.

An annular member 124 is disposed in the annular recess 114 in the body member 104. The annular member 104 includes a surface 126 arranged to engage the exterior surface of the valve member 120 and an inner periphery 128 having a diameter C that is considerably larger than the diameter A of the small end of the flow port 122. The annular member 124 is preferably constructed from an erosion resistant material.

An upstream seal assembly 130 is disposed in the counterbore 112 of the body member 104 adjacent the end face 118 on the inlet member 106. The seal assembly 130 includes a relatively rigid annular seal body 132 having an outer periphery 134 sized to fit slidingly within the counterbore 112.

An O-ring seal 136 is disposed in an annular groove 138 formed in the outer periphery 134 of the seal assembly 130. The O-ring seal 136 is in sliding and sealing engagement with the valve body member 104 in the counterbore 112.

The seal assembly 130 also includes a surface 140 disposed adjacent the exterior of the valve member 120. An annular seal member 142 is carried by the surface 140 and is arranged to sealingly engage the exterior surface of the valve member 120.

The inner periphery 144 on the seal assembly 130 has a diameter D that is substantially equal to the diameter B of the large end of the flow port 122 and is constructed substantially equal to the diameter C of the inner periphery 128 of the annular member 124.

OPERATION OF THE EMBODIMENT OF FIGURE 4

As can be appreciated from comparing FIG. 4 with FIG. 1, the seal arrangement and operation in the valve 100 is identical to that previously described in connection with the valve 10. However, it should be emphasized that the throttling effect of the valve 100 is attained in a slightly different manner due to the substantially equal diameters C and D of the annular member 124 and the seal assembly 130, respectively.

As may be expected from viewing FIG. 4, the throttling effect created in the valve 100, when the valve member is in the open position as illustrated in FIG. 4, occurs due to the configuration of the flow port 122 alone. Since the effective diameters C and D of the openings 110 and 116 in the valve body 102 are substantially identical in size, no throttling is created thereby, except in cooperation with the valve member 120 as will be described.

Figure 5:
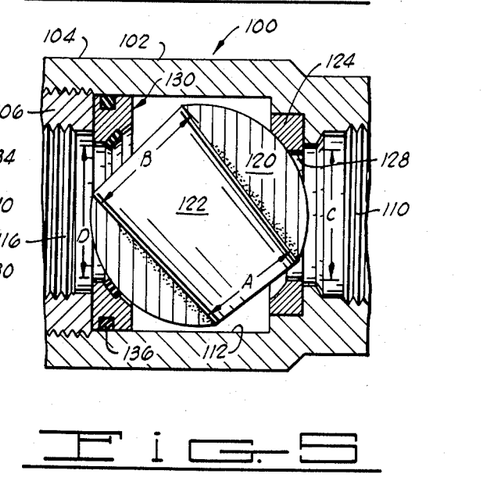
FIG. 5 is a view similar to FIG. 4 but illustrating the valve member in a throttling position.

As the valve member 120 is rotated toward the closed position, the flow passageway extending through the valve 100 is defined by the relationship between the flow port 122 and the inner periphery 128 of the annular member 124 as clearly shown in FIG. 5. As shown therein, the valve member 120 is in a position approaching the maximum throttling condition, that is, the position wherein the minimum area flow passageway extends through the valve 100.

It will be noted therein that the large end of the flow port 122 is substantially fully open. Thus, little or no velocity change in fluid flowing through the valve 100 occurs in the vicinity of the seal assembly 130. Manifestly, the velocity increase in the fluid flowing through the valve 100 occurs adjacent the annular member 124 due to the reduction in flow area defined by the flow port 122 and the inner periphery 128 of the annular member 124. Thus, the erosion due to the fluid flow is concentrated on the annular member 124.

FIG. 5 illustrates the reason for arranging the flow port 122 eccentrically as previously described. That is, if the flow port 122 were concentrically arranged as described in connection with the flow port 36 and the diameters C and D maintained substantially equal, the flow area adjacent the large end of the port 122 would be closed at the same time that the small end produces the maximum throttling effect, that is, when the small end of the port 122 cooperates with the annular member 124 to provide the minimum flow area. However, since the flow port 122 extends eccentrically through the valve member 120, it is possible to maintain a relatively large flow area adjacent the large end of the flow port 122 while simultaneously attaining maximum throttling adjacent the small end thereof.

As previously mentioned, the seal arrangement within the valve 100 is substantially identical to that previously described in connection with FIG. 1. Thus, when the valve member 120 is rotated until the flow port 122 extends substantially perpendicularly to the openings 110 and 116 (not shown), the seal assembly 130 is biased toward the valve member 120 due to the fluid pressure in the inlet opening 116. As a result, the seal assembly 130 is maintained in sealing engagement with the exterior of the valve member 120 providing a complete closure of the valve 100.

From the foregoing, it can be appreciated that the valve 100 provides the advantages previously described in connection with the embodiment of FIG. 1. That is, the valve 100 can be utilized to provide the desired throttling effect and yet provide for the complete closure of the valve when the valve member is rotated to the fully closed position.

Figure 6:
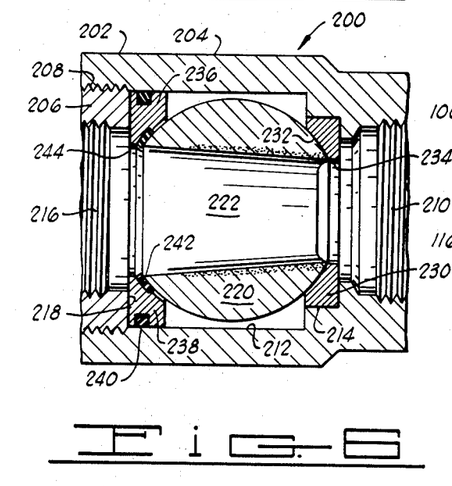
FIG. 6 is a cross-sectional view similar to FIG. 2, but illustrating another embodiment of throttling valve also constructed in accordance with the invention.

EMBODIMENT OF FIGURE 6

The fragmentary cross-sectional view of FIG. 6 illustrates another embodiment of throttling valve generally designated by the reference character 200 and also constructed in accordance with the invention. As shown therein, the valve 200 includes a valve body 202 comprising a valve body member 204 and an inlet or upstream member 206 that is threadedly connected with the body member 204 by mating threads 208.

The body member 204 includes a partially threaded opening 210 that extends therethrough, a first counterbore 212 forming the valve chamber, and a second counterbore forming a recess 214 formed in the body member 204 adjacent the end of the counterbore 212. The inlet member 206 includes a partially threaded opening 216 that extends therethrough, and an end face 218 that is disposed in the body member 202 substantially perpendicular to the axis of opening 216.

Figure 6A:
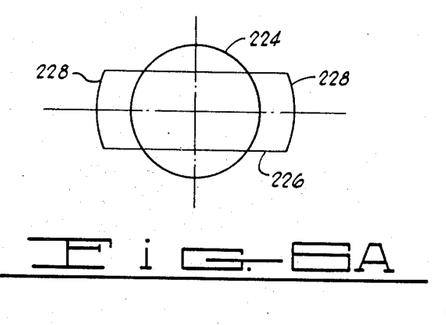
FIG. 6A is a diagrammatic view illustrating one configuration of the ends of the flow port of the valve shown in FIG. 6.

A valve member 220 is disposed in the counterbore 212 of the body member 204 and has a flow port 222 extending therethrough. FIG. 6A illustrates the configuration of the flow port at each end. As shown in FIG. 6A, the port opening 224 is adjacent the opening 216 and is circular in shape. The port opening 226 is adjacent opening 210 and is basically rectangular in shape. In this view the ends 228 of opening 226 appear rounded in shape, conforming to the shape of the surface of valve member 220. The flow port 222 is so constructed that the opposite ends, or rather the port openings 224 and 226, are of equal area. The purpose of the difference in shape to be more fully described hereinafter. It will be understood that the valve member 220 is operated by a stem and handle in the same manner as the valve member 34 in FIG. 1.

An annular member 230 is disposed in recess 214 of the body member 304. The annular member 230 is constructed basically similar to annular member 60 to FIG. 1, including a surface 232 arranged to engage the exterior surface of the valve member 220. The annular member 230 is preferably constructed from an erosion-resistant material. The inner periphery 234 of annular member 230 substantially conforms in size and shape with the port opening 226 shown in FIG. 6A.

An upstream seal assembly 236 is disposed in the counterbore 212 adjacent end face 218. The construction of the upstream seal assembly 236 is substantially similar to seal assembly 68 previously described and shown in FIG. 2; including a relatively rigid seal body 238, which is sized to slidingly fit within the counterbore 212 of the valve body member 204, an O-ring seal 240, an annular seal member 242 and an inner periphery 244. The diameter of the inner periphery 244 is substantially the same as the diameter of the flow port opening 224 shown in FIG. 6A.

OPERATION OF THE EMBODIMENT OF FIGURE 6

Operationally, the valve 200 functions in a manner very similar to the previously described valve 10. It will be noted that the primary distinction between the valves 10 and 200 is that in valve 200 the areas 224 and 226 of the flow port 222 are substantially equal.

In the valve 200, it can be seen that the upstream seal assembly 236 functions in conjunction with the valve member 220 to form the upstream seal in valve 200 when the valve member 220 is in the position closing the valve (not shown), that is, when the valve member 220 has been rotated to a position wherein the flow port 222 extending therethrough is disposed substantially at a right angle to the position illustrated in FIG. 6, exactly as described with relation to the upstream seal assembly 78 of valve 10 shown in FIG. 1.

Since the areas 224 and 226 of flow port 222 are substantially equal, virtually no throttling of the fluid flow will occur when the valve member 220 is in the open position as shown in FIG. 6. The flow port 222, in cooperation with annular member 230, will throttle the fluid flow increasingly as the valve member 220 is rotated to a position closing valve. The length of port opening 226 is substantially parallel to the axis of rotation of the valve member 220, so that in cooperation with annular member 230, the port opening 226 is closed prior to the closure of port opening 224 as the valve member 220 is rotated to a closed position, thereby concentrating the erosive effect of the fluid flow on the annular member 230 as previously described.

From the foregoing it can be appreciated that the valve 200 not only provides the desired throttling function, including appropriately arranged and constructed seals to assure that the valve 200 will provide a complete closure of the valve when the valve member 220 is rotated to a closed position, but because of the unique shape and arrangement of the flow port openings 224 and 226, provides the advantages of equal area porting. Manifestly, and as previously described, such closure can be attained despite the erosion or wear of the annular member 230.

Figures 7, 7A, 8, 9:
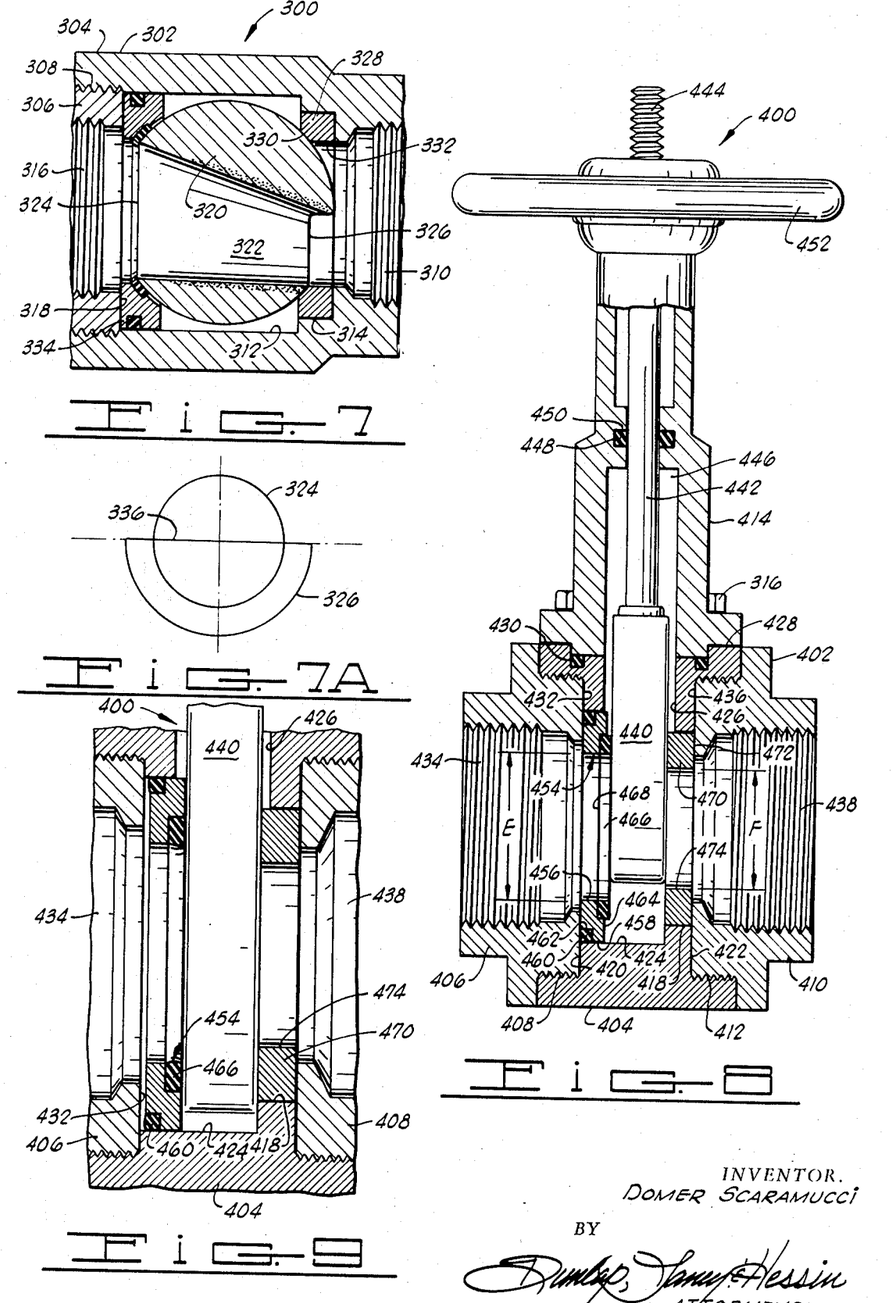
FIG. 7 is a cross-sectional view similar to FIG. 6, but illustrating another embodiment of the ball valve.
FIG. 7A is a diagrammatic view illustrating one configuration of the ends of the flow port of the valve shown in FIG. 7.
FIG. 8 is a vertical cross-sectional view of a gate valve constructed in accordance with the invention.
FIG. 9 is an enlarged, fragmentary cross-sectional view of a portion of the valve of FIG. 8 illustrating the valve member in the closed position.

EMBODIMENT OF FIGURE 7

The cross-sectional view of FIG. 7 illustrates another embodiment of the throttling valve generally designated by the character reference 300. It will be understood that the throttling valve 300 includes the necessary operating components as previously described in connection with FIG. 1.

As shown in FIG. 7, the valve 300 includes a valve body 302 comprising a body member 304 and an inlet member 306 connected with the body member 304 by mating threads 308. The valve body member 304 includes a partially threaded opening 310 that extends therethrough, a first counterbore 312 forming the valve chamber, and a second counterbore forming a recess 314 formed in the body member 304 adjacent the end of the counterbore 312. The inlet member 306 also has an opening 316 that is partially threaded and extends therethrough, and an end face 318 that is disposed in the body member 302 substantially perpendicularly to the axis of opening 316.

A valve member 320 is disposed in the counterbore 312 in the body member 304 and has a flow port 322 extending therethrough. FIG. 7A illustrates the shape of the flow port at each end. The port opening 324 is adjacent the opening 316 and is circular in shape. The port opening 326 is adjacent opening 310 and is semicircular in shape. The areas of the port openings 324 and 326 are substantially equal. It may be seen that valve 300 is substantially the same as valve 200 in FIG. 6 previously described, in that both provide equal area porting. The main difference being that FIG. 7 illustrates a different combination of configurations of the port openings.

An annular member 328 is disposed in recess 314 of the body member 304. The annular member 328 has a surface 330 arranged to engage the exterior surface of the valve member 320, and includes an inner periphery 332. As shown in FIG. 7, the inner periphery 332 is greater than the radius of port opening 326 in FIG. 7A the reason for which to be described more fully hereinafter. The annular member 332 is constructed from an erosion-resistant material. It will be observed in FIG. 7 that the port opening 326 is so located with respect to port opening 324 and annular member 328 that when the valve member 320 is in the open position as shown in FIG. 7, a portion, which is the largest diameter portion 336 of port opening 326, is substantially in alinement with the center line of annular member 328 and the center line of port opening 324, the remaining portion or the semicircular arc portion of port opening 326 being substantially in alinement with a portion of the inner periphery 332 of annular member 328.

An upstream seal assembly 334 is disposed in chamber bore 312. The construction of the upstream seal assembly 334 is identical to seal assembly 68 previously described and shown in FIG. 2.

OPERATION OF THE EMBODIMENT OF FIGURE 7

Operationally, the valve 300 functions in a manner similar to the previously described valve 200. It is again noted that the primary distinction is in the combination of configurations of the port openings 324 and 326.

Since the largest diameter portion 336 of port opening 326 is substantially in alinement with the center line of port opening 324 and the center line of annular member 328 as previously described, it may be appreciated that as the valve member 320 is rotated to a closed position, the port opening 326 in cooperation with annular member 328 will effect a closure of port opening 326 prior to the closure of port opening 324, thereby concentrating the erosive effect of the fluid flow on the annular member 328 in a manner as previously described with respect to annular member 230 of FIG. 6.

The seal assembly 334 functions in a manner identical to that of seal assembly 68 of FIG. 2, as previously described.

It may be appreciated from the foregoing that all of the functional and operational advantages of valve 200 are included in valve 300. It is also apparent that valve 200 and valve 300 illustrate only two of the combinations of flow port opening configurations which may be utilized to provide equal area porting and yet retain the advantages of a construction which concentrates the erosive effect of fluid flow on the downstream annular member while the upstream seal assembly provides a fluid tight seal on closure of the valve.

EMBODIMENT OF FIGURE 8

The cross-sectional view of FIG. 8 illustrates a throttling valve of the gate type generally designated by the reference character 400 and also constructed in accordance with the invention. As shown therein, the gate valve 400 includes a valve body 402 comprising a valve body member 404, an inlet member 406 connected with the body member 404 by threads 408, and an outlet member 410 that is also connected with the body member 404 by threads 412. The valve body 402 also includes a body extension member 414 connected with the body member 404 by a plurality of threaded fasteners 416.

The preferred form of the body member 404 includes a bore 418 that extends therethrough intersecting end faces 420 and 422 thereon. A counterbore 424 extends into the body member 404 from the end face 420. The body member 404 also includes an opening 426 that extends transversely therethrough intersecting the bore 418.

As clearly shown in FIG. 8, an O-ring seal 428 is disposed in a recess 430 encircling the opening 426. The O-ring seal 428 is arranged to sealingly engage the extension member 414 thereby preventing the escape of fluid between the extension member 414 and the body member 404.

The inlet member 406 includes an end face 432 that is in engagement with the end face 420 of the valve body member 404 and a partially threaded opening 424 that extends therethrough intersecting the end face 432. The outlet member 410 includes an end face 436 that is in engagement with the end face 422 on the valve body member 404 and a partially threaded opening 438 that extends therethrough intersecting the end face 436.

A valve gate member 440 is disposed in the valve body member 404. The upper end of the valve gate member 404 is connected with a valve operating rod 442 having a plurality of threads 444 formed on the upper end thereof. The valve operating rod 442 extends through an opening 446 formed in the body extension member 414. The opening 446 is sized to receive the valve gate member 440 when the valve gate member 440 is raised to a position opening the bore 418 (not shown).

An O-ring seal 448 is disposed in an annular recess 450 formed in the extension member 414 encircling the valve operating rod 442. The O-ring seal 448 sealingly engages the valve operating rod 442 to prevent the escape of fluid from the opening 446.

A valve operating handle 452 is disposed at the upper end of the extension member 414 in threaded engagement with the threads 444 on the operating rod 442. As is well known to those skilled in the valve art, rotation of the handle 452 in the appropriate direction results in either the upward or downward movement of the operating rod 442 and of the interconnected valve gate member 440 to open and close the valve 400.

An annular seal assembly 454 is disposed in the counterbore 424 in the valve body member 404. The seal assembly 454 includes a relatively rigid seal body 456 having an outer periphery 458 sized to slidingly fit within the counterbore 424.

An annular seal 460 is disposed in a recess 462 formed in the outer periphery 458 of the seal body 456. The annular seal 460 is in sliding and sealing engagement with the valve body member 404 in the counterbore 424.

The seal body 456 also includes a surface 464 disposed adjacent the valve gate member 440. An annular seal member 466 is disposed in an annular recess 468 formed in the surface 464 of the seal body 456. The annular seal member 466 is arranged to sealingly engage the valve gate member 440.

When the valve member 440 is in fully open position (not shown), it can be seen that the inner periphery of the seal assembly 450 defines a diameter E. Thus, the maximum flow area extending through the upstream side of the valve 400 has an area determined by the diameter E.

An annular member 470 that is preferably constructed from an erosion resistant material is disposed in the bore 418 of the valve body 404 on the downstream side of the valve gate member 440. The annular member 470 has a surface 472 thereon that is in engagement with the end face 436 on the downstream member 410.

An inner periphery 474 on the annular member 470 has a diameter F that is smaller than the diameter E of the inner periphery of the seal assembly 454. Thus, it can be seen that when the valve gate member 444 is in the fully open position (not shown) the maximum flow area through the valve 400 is defined by the diameter F.

OPERATION OF THE EMBODIMENT OF FIGURE 8

When the valve 400 in the fully open position (not shown), that is, when the valve gate member 440 is raised into the opening 446, clearing the flow passageway as defined by the inner periphery 474 of the annular member 470, it can be appreciated that some throttling occurs in the valve 400 due to the annular member 470. As the valve member 440 is moved downwardly into the opening 426 of the valve body member 404, the valve gate member 440 cooperates with the inner periphery 474 of the annular member 470 to define a restricted flow passageway, thereby throttling fluid flowing through the valve 400.

As previously mentioned, the reduction in flow passageway area causes a velocity increase in the fluid flowing. As can be seen in FIG. 8, the area of the passageway adjacent the seal assembly 454 is larger than the flow passageway formed by the valve gate member 440 and the annular member 470 due to the difference between the diameters E and F. Thus, the increase in the velocity of fluid flow occurs primarily adjacent the annular member 470 and, consequently, fluid erosion is concentrated at this point. Also, the area of the flow passageway adjacent the seal assembly 454 is greater than the flow passageway adjacent the annular member 470 as the valve gate member 440 approaches the maximum throttling position, that is, as the gate valve member 440 tends to close the flow passageway adjacent the annular member 490 so that the velocity of fluid flow adjacent the annular member 490 so that the velocity of fluid flow adjacent the seal assembly 454 is considerably less than adjacent the annular member 470.

When the valve gate member 440 is moved to the fully closed position as illustrated in FIG. 9, fluid pressure in the opening 434 acts on the seal assembly 454 to move the seal assembly 454 along the counterbore 424 and into sealing engagement with the valve gate member 440. As can be appreciated from viewing FIG. 9, a fluidtight closure of the valve 400 is attained due to the sealing engagement between the annular seal member 466 and the valve gate member 440 and due to the sealing engagement between the annular seal 460 and the valve body member 404 in the counterbore 424. Thus, the valve 400 is constructed to provide the optimum throttling characteristics while effectively eliminating erosive wear on the seal assembly 454 whereby a complete and fluidtight closure of the valve can be attained.

It should be apparent from the foregoing that each of the valve members and annular members described are to be constructed from or treated with suitable erosion resistant materials. Thus, the valves are suitable for extended service under throttling conditions.

Although the various embodiments have been described and illustrated in the drawings as included between threaded connecting members it is apparent that the invention could be included between various types of connecting members such as flanged connecting members.

It should be understood that the embodiments described in detail hereinbefore are presented by way of example only and that many changes and modifications can be made thereto without departing from the spirit of the invention or from the scope of the annexed claims.

I claim:

1. A throttling valve including:
   a valve body having upstream and downstream ends and a bore extending therethrough;
   replaceable first annular means secured in a fixed position in the downstream end of said body and encircling a portion of said bore;
   second annular means in said body spaced from said first annular means and also a portion of said bore; and
   a valve member disposed in said bore relatively between said first and second annular means and movable relative to said first and second annular means to define with said first annular means a variable area flow passageway extending through said valve, said valve member being movable from a position wherein said flow passageway is fully open to a position wherein said valve member engages said second annular means to close said flow passageway, said flow passageway being shaped to be closed at said first annular means prior to being closed at said second annular means when said valve member is being moved to a closed position to concentrate erosive wear in said valve at said first annular means when the flow passageway is partially open;
   wherein said second annular means includes:
      a relatively rigid seal body slidingly disposed in said bore;
      a first resilient annular member carried by said seal body sealingly engaging said valve member when said valve member is in the position closing said passageway;
      a second resilient annular member carried by said seal body in sliding and sealing engagement with said valve body in said bore along a diameter greater than the diameter of said first resilient annular member, whereby said second annular seal means will be biased toward the valve member by pressure in the upstream end of the valve; and
   wherein the first annular means is formed from a material more erosion-resistant than the second annular means.

2. The throttling valve of claim 1 wherein the valve member is a ball having a port extending therethrough, said port having opposite ends of different configurations but of equal area.

3. The throttling valve of claim 2 wherein one of said ends of said port is circular in shape and the opposite end of said port is rectangular in shape.

4. The throttling valve of claim 2 wherein one of said ends of said port is circular in shape and the opposite end of said port is semicircular in shape.

5. A throttling valve including:
   a valve body having upstream and downstream ends and a bore extending therethrough;
   replaceable first annular means secured in a fixed position in the downstream end of said body and encircling a portion of said bore;
   second annular means disposed in said bore in spaced relation to said first annular means and also encircling a portion of said bore, said second annular means having an inner diameter larger than the inner diameter of said first annular means; and
   a valve member movably disposed in said bore between said first and second annular means and movable relative to said first and second annular means to define with said first annular means a variable area flow passageway extending through said valve, said valve member being movable from a position wherein said flow passageway is fully open to a position wherein said valve member engages said second annular means to close said flow passageway, said valve member substantially closing the flow passageway adjacent said first annular means prior to closure of said passageway adjacent said second annular means to concentrate erosive wear in the valve at said first annular means when the flow passageway is partially open;
   wherein said second annular means includes:
      a relatively rigid seal body slidingly disposed in said bore;
      a first resilient annular member carried by said seal body sealingly engaging said valve member when said valve member is in the position closing said passageway;
      a second resilient annular member carried by said seal body in sliding and sealing engagement with said valve body in said bore along a diameter greater than the diameter of said first resilient annular member, whereby said second annular seal means will be biased toward the valve member by pressure in the upstream end of the valve; and
   wherein the first annular means is formed of a material more erosion-resistant than the second annular means.

6. The throttling valve of claim 5 wherein said valve member is a gate slidingly disposed in said bore for movement between open and closed positions of said flow passageway.

7. The throttling valve of claim 5 wherein said valve member is rotatably mounted in said bore and has a flow port extending therethrough, said flow port having a diameter at one end substantially equal to the inner diameter of said second annular means and a diameter at the other end substantially equal to the inner diameter of said first annular means.

8. The throttling valve of claim 7 wherein said valve member is spherical in configuration.

9. A throttling valve including:
   a valve body having upstream and downstream ends with a bore extending therethrough intersecting said upstream and downstream ends;
   first annular means located in the downstream end of said body having an inner periphery encircling a portion of said bore and a surface formed from erosive resistant material;
   second annular means located in said bore in spaced relation to said first annular means and also having an inner periphery encircling a portion of said bore, the diameter of the inner periphery on said first annular means being substantially equal to the diameter of the inner periphery on said second annular means; and
   a valve member rotatably mounted in said body between said first and second annular means and cooperating with said surface to define a variable area flow passageway extending through said valve, said valve member having a flow port extending therethrough, said port having a diameter at the end thereof adjacent said second annular means substantially equal to the diameter of the inner periphery thereon and a diameter at the other end smaller than the diameter of said first-mentioned end, said port extending eccentrically through said valve member, said valve member being rotatable between a position coaxially alining the large end of said port with the inner periphery of said second annular means and eccentrically alining the small end of said port with the inner periphery of said first annular means, whereby the maximum area flow passageway is provided and a position wherein said flow port is disposed at a substantially right angle to said bore closing said flow passageway, said port being arranged in said valve member whereby rotation of said valve member substantially closes said flow passageway adjacent said first annular means prior to closure of said passageway adjacent said second annular means to concentrate erosive wear in the valve at said surface when the flow passageway is partially open;
   wherein said second annular means includes:
      a relatively rigid seal body slidingly disposed in said bore;
      a first resilient annular member carried by said seal body sealingly engaging said valve member when said valve member is in the position closing said passageway; and a second resilient annular member carried by said seal body in sliding and sealing engagement with said valve body in said bore along a diameter greater than the diameter of said first resilient annular member, whereby said second annular seal means will be biased toward the valve member by pressure in the upstream end of the valve.